US012583039B2

(12) United States Patent     (10) Patent No.:    US 12,583,039 B2

Noda et al.                 (45) Date of Patent:      Mar. 24, 2026

(54) ROLL MANUFACTURING METHOD, ROLL MANUFACTURING APPARATUS, ROLL, AND TRANSFER OBJECT

(71) Applicant: Dexerials Corporation, Shimotsuke (JP)

(72) Inventors: Kazuhiko Noda, Shimotsuke (JP); Katsuhiro Doi, Shimotsuke (JP); Junichi Sasaki, Shimotsuke (JP); Asahiko Nogami, Shimotsuke (JP); Kyoko Sakurai, Shimotsuke (JP)

(73) Assignee: Dexerials Corporation, Shimotsuke (JP)

( * ) Notice: Subject to any disclaimer, the term of this patent is extended or adjusted under 35 U.S.C. 154(b) by 261 days.

(21) Appl. No.: 18/567,121

(22) PCT Filed: May 27, 2022

(86) PCT No.: PCT/JP2022/021797

§ 371 (c)(1),
(2) Date: Dec. 5, 2023

(87) PCT Pub. No.: WO2022/270229

PCT Pub. Date: Dec. 29, 2022

(65) Prior Publication Data

US 2024/0269756 A1     Aug. 15, 2024

(30) Foreign Application Priority Data

Jun. 24, 2021    (JP) .................................. 2021-105084

(51) Int. Cl.
    *B23C 3/02*        (2006.01)
    *B29C 33/38*      (2006.01)
           (Continued)

(52) U.S. Cl.
    CPC ............ *B23C 3/02* (2013.01); *B29C 33/3842* (2013.01); *B29C 59/046* (2013.01); *B29K 2033/04* (2013.01); *B29L 2011/0016* (2013.01)

(58) Field of Classification Search
    CPC ........ B23C 3/02; B29C 33/3842; B29C 33/42
    See application file for complete search history.

(56) References Cited

U.S. PATENT DOCUMENTS 6,419,278 B1 *   7/2002   Cunningham  ...... F16L 33/2071
                                       285/256
7,349,159 B2 *   3/2008   Shimizu  .............. G02B 3/0031
                                       359/619

(Continued)

FOREIGN PATENT DOCUMENTS

CN        1762678 A      4/2006
JP     2006116826 A      5/2006

(Continued)

OTHER PUBLICATIONS

Jun. 28, 2022, International Search Report issued in the International Patent Application No. PCT/JP2022/021797.

(Continued)

*Primary Examiner* — Sean M Michalski

(74) *Attorney, Agent, or Firm* — KENJA IP LAW PC

(57)              ABSTRACT

A roll manufacturing apparatus includes a rotary device including a rotary encoder, a cutting tool stage that holds a spindle unit, which includes a rotatable cutting blade, reciprocatably in a radial direction of a roll and is movable in the radial direction of the roll, a signal generator that generates, based on signals output from the rotary encoder, a control waveform indicating a movement pattern to reciprocate the cutting blade at positions corresponding to predetermined cutting portions, and a controller that moves the cutting tool stage so that a cutting process of reciprocating the cutting blade in the radial direction of the roll while rotating the (Continued)

cutting blade, according to the control waveform, to perform cutting once or multiple times with the cutting blade at a predetermined cutting depth is performed multiple times.

6 Claims, 15 Drawing Sheets

(51) Int. Cl.
B29C 59/04 (2006.01)
B29L 11/00 (2006.01)
B29K 33/04 (2006.01)

(56) References Cited

U.S. PATENT DOCUMENTS

| | | | | |
|---|---|---|---|---|
| 9,779,920 B2 * | 10/2017 | West | ................... | C23C 14/3407 |
| 10,049,863 B2 * | 8/2018 | West | ................... | H01J 37/3405 |
| 10,533,726 B2 * | 1/2020 | De Zwart | ............... | F21V 14/06 |
| 10,565,905 B2 * | 2/2020 | Suzuki | ............... | G02B 19/0028 |
| 11,011,356 B2 * | 5/2021 | West | ................... | H01J 37/3405 |
| 2004/0119174 A1 * | 6/2004 | Hofmann | ............ | B29C 33/3842 |
| | | | | 264/1.32 |
| 2006/0087741 A1 * | 4/2006 | Shimizu | ............... | G02B 3/0031 |
| | | | | 359/619 |
| 2008/0304287 A1 * | 12/2008 | Chiang | ................. | B29C 33/424 |
| | | | | 362/333 |
| 2009/0044669 A1 * | 2/2009 | Liu | ......................... | B23C 3/023 |
| | | | | 82/1.11 |
| 2014/0087140 A1 * | 3/2014 | Benson | .............. | B29C 35/0866 |
| | | | | 428/156 |
| 2014/0295145 A1 * | 10/2014 | Mizuno | .................. | B32B 27/32 |
| | | | | 264/250 |
| 2015/0004368 A1 * | 1/2015 | Witzke | ................... | B29C 43/24 |
| | | | | 427/365 |
| 2015/0004376 A1 * | 1/2015 | Hong | ...................... | B32B 23/08 |
| | | | | 427/508 |
| 2020/0094430 A1 * | 3/2020 | Noda | .................... | B29C 59/022 |
| 2025/0311450 A1 * | 10/2025 | Lemoff | ................. | H10F 39/024 |

FOREIGN PATENT DOCUMENTS

| | | | |
|---|---|---|---|
| JP | 2009172647 A | 8/2009 | |
| JP | 2011197546 A | 10/2011 | |
| JP | 2012013748 A | 1/2012 | |
| JP | 2013035057 A | 2/2013 | |
| JP | 2013113955 A | 6/2013 | |
| JP | 2016107484 A | 6/2016 | |
| JP | 2020049646 A | 4/2020 | |
| WO | 2018051851 A1 | 3/2018 | |

OTHER PUBLICATIONS

May 7, 2025, Notification of Reasons for Refusal issued by the Japan Patent Office in the corresponding Japanese Patent Application No. 2021-105084.

Dec. 14, 2023, International Preliminary Report on Patentability issued in the International Patent Application No. PCT/JP2022/021797.

Nov. 11, 2025, Official Decision of Refusal issued by the Japan Patent Office in the corresponding Japanese Patent Application No. 2021-105084.

Nov. 27, 2025, Office Action issued by the China National Intellectual Property Administration in the corresponding Chinese Patent Application No. 202280031130.4.

Dec. 23, 2025, Office Action issued by the Korean Intellectual Property Office in the corresponding Korean Patent Application No. 10-2023-7044076.

* cited by examiner

FRONT VIEW                    SIDE VIEW

FRONT VIEW                    SIDE VIEW

FRONT VIEW                SIDE VIEW

FRONT VIEW                SIDE VIEW

FRONT VIEW                    SIDE VIEW

TRIGGER SIGNAL

PULSE SIGNAL

CONTROL WAVEFORM

TIME

*FIG. 6*

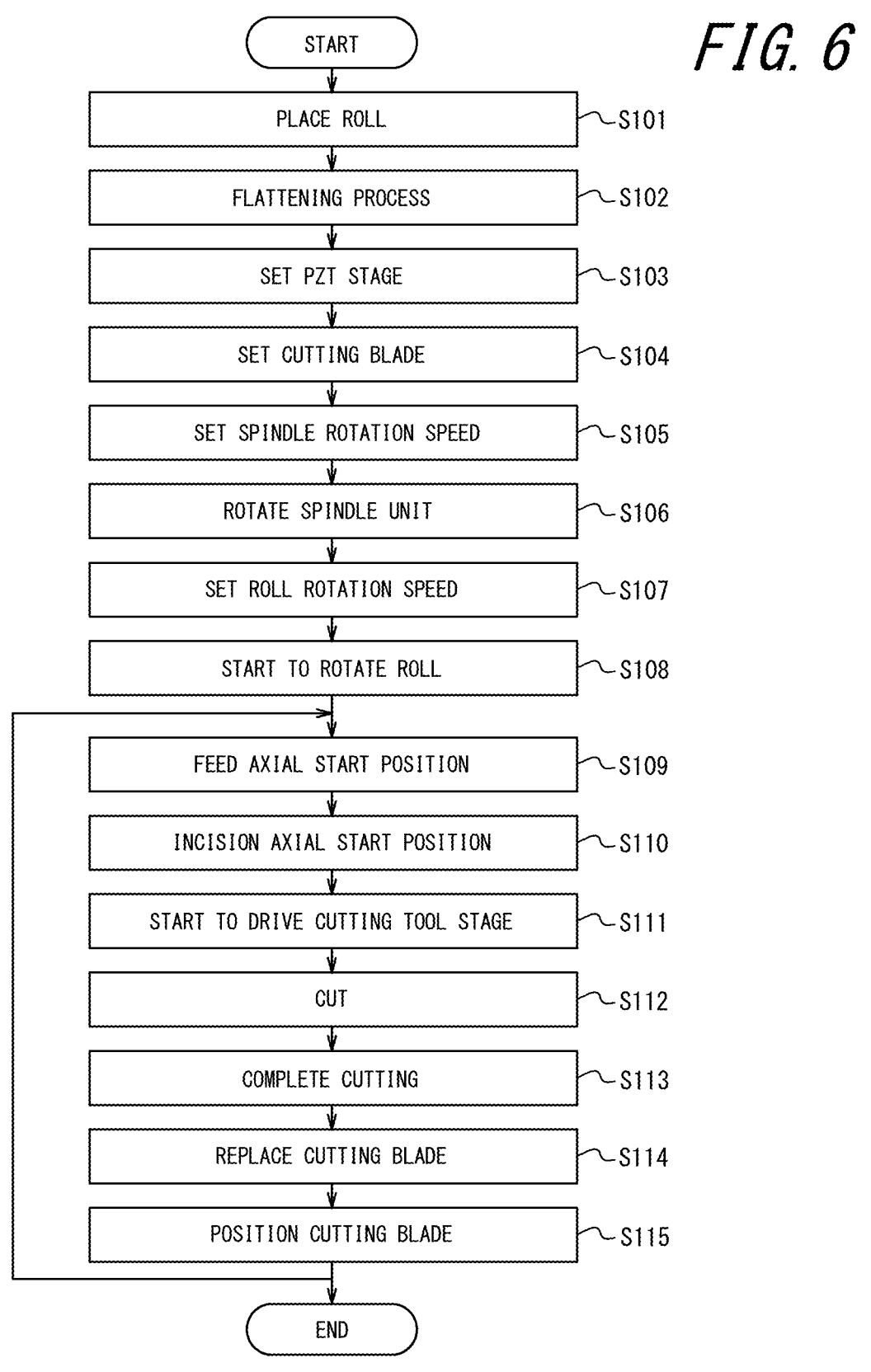

START

PLACE ROLL — S101

FLATTENING PROCESS — S102

SET PZT STAGE — S103

SET CUTTING BLADE — S104

SET SPINDLE ROTATION SPEED — S105

ROTATE SPINDLE UNIT — S106

SET ROLL ROTATION SPEED — S107

START TO ROTATE ROLL — S108

FEED AXIAL START POSITION — S109

INCISION AXIAL START POSITION — S110

START TO DRIVE CUTTING TOOL STAGE — S111

CUT — S112

COMPLETE CUTTING — S113

REPLACE CUTTING BLADE — S114

POSITION CUTTING BLADE — S115

END

CONTROL WAVEFORM

CONTROL WAVEFORM

ROLL MANUFACTURING METHOD, ROLL MANUFACTURING APPARATUS, ROLL, AND TRANSFER OBJECT

TECHNICAL FIELD

This application claims priority to Japanese Patent Application No. 2021-105084, filed on Jun. 24, 2021, the entire contents of which are incorporated herein by reference.

This disclosure relates to a roll manufacturing method, a roll manufacturing apparatus, a roll, and a transfer object.

BACKGROUND

Microlens arrays, in which a large number of microscopic lenses (microlenses) are arranged two-dimensionally, are used in various applications such as diffusion plates, diffusion sheets, or screens for head-up displays. As a method for manufacturing microlens arrays with high mass productivity, there is a method in which a pattern (hereinafter referred to as "transfer pattern") of an inverted shape of a standard pattern of the microlens arrays is formed on a mold surface, the transfer pattern formed on the mold surface is transferred onto a resin applied to a base material, and the resin after transfer is cured. By cutting the resin after curing as necessary, the desired microlens arrays can be manufactured.

In the method described above, the use of a roll mold in which a transfer pattern is formed on a surface of a cylindrical or columnar roll and the use of a roll-to-roll method allow to manufacture microlens arrays with high uniformity in quality with high mass productivity.

As a method for manufacturing a roll used as the roll mold described above, there is a method of forming a transfer pattern on a roll by cutting a surface of the cylindrical or columnar roll with a cutting blade. For example, Patent Literature (PTL) 1 describes technology for cutting a surface of a roll by reciprocating a cutting blade in a radial direction of the roll while rotating the roll. PTL 2 also describes technology for cutting a surface of a roll by rotating an electric spindle with a ball end mill attached to a tip end of the electric spindle and cutting into the surface of the roll with the rotating ball end mill.

CITATION LIST

Patent Literature

PTL 1: JP 2012-013748 A
PTL 2: JP 2013-113955 A

SUMMARY

Technical Problem

When a transfer pattern is formed by cutting a roll, protrusions called burrs may occur on a surface of the roll due to cutting. It is known that transfer using the transfer pattern with the burrs may result in transfer of a shape including the burrs, which is different from a desired microlens array pattern, leading to deterioration in the quality of microlens arrays to be manufactured. In particular, it is known that when the height difference of unevenness of a transfer pattern exceeds 20 μm, occurring burrs adversely affect the optical performance of microlens arrays.

To prevent the occurrence of burrs as described above, there is a method of forming cutting holes of a desired depth by repeating the cutting of a roll multiple times. In this method, the occurrence of burrs can be prevented by gradually decreasing a cutting depth at which the roll is cut. This method requires to cut the same cutting portions accurately multiple times, but the technology described in PTLs 1 and 2 do not sufficiently consider technology for cutting the same cutting portions accurately multiple times.

In the technology described in PTL 1, by reciprocating a cutting blade 100 in a radial direction of a roll 1, as illustrated in FIG. 11, the cutting blade 100 cuts a surface of the roll 1 as if the cutting blade 100 slides semicircularly with respect to the surface of the roll 1. The cutting blade 100 has a face 100a positioned toward a cutting direction to make a tip sharp, and another face 100b inclined toward the face 100a. Hereafter, the angle between the surface of the roll 1 and the other face 100b of the cutting blade 100, when the face 100a of the cutting blade 100 is perpendicular to the surface of the roll 1, is referred to as a bit relief angle. Because the cutting blade 100 has the bit relief angle, an incident angle θ, which is an inclination of a wall surface of a recess, with respect to the surface of the roll 1, at an opening end of the recess, cannot be greater than or equal to the bit relief angle. The bit relief angle of the cutting blade 100 is generally of the order of 40°. Therefore, when the roll 1 is cut using the cutting blade 100, it is difficult to make the incident angles of cutting holes to be 40° or more.

In addition, the technology described in PTL 2 has the problem of taking an enormous amount of time for machining because cutting holes are formed one by one by numerical control (NC).

It would be helpful to provide a roll manufacturing method, a roll manufacturing apparatus, a roll, and a transfer object that can form cutting holes by accurately cutting the same cutting portions on a roll multiple times, while preventing an increase in machining time, and that can form cutting holes with larger incident angles.

Solution to Problem

A roll manufacturing method according to an embodiment is a roll manufacturing method by a roll manufacturing apparatus including a rotary device and a cutting tool stage, the rotary device configured to rotate a cylindrical or columnar roll in a circumferential direction and including a rotary encoder that output a signal corresponding to a rotational position of the roll, the cutting tool stage being movable in a radial direction of the roll, the cutting tool stage being configured to hold a spindle unit reciprocatable in the radial direction of the roll, the spindle unit including a cutting blade rotatable with the radial direction of the roll as a rotation axis, the roll manufacturing method including:

generating, based on the signal output from the rotary encoder, a control waveform indicating a movement pattern of the cutting blade to reciprocate the cutting blade in the radial direction of the roll at a position corresponding to a predetermined cutting portion on a surface of the roll; and moving the cutting tool stage in the radial direction of the roll so that a cutting process of reciprocating the cutting blade in the radial direction of the roll while rotating the cutting blade, according to the control waveform, to cut the predetermined cutting portion once or multiple times with the reciprocating cutting blade at a predetermined cutting depth is performed multiple times.

A roll manufacturing apparatus according to an embodiment includes:

a rotary device configured to rotate a cylindrical or columnar roll in a circumferential direction and including a rotary encoder that output a signal corresponding to a rotational position of the roll;

a cutting tool stage movable in a radial direction of the roll, the cutting tool stage being configured to hold a spindle unit reciprocatably in the radial direction of the roll, the spindle unit including a cutting blade rotatable with the radial direction of the roll as a rotation axis;

a signal generator configured to generate, based on the signal output from the rotary encoder, a control waveform indicating a movement pattern of the cutting blade to reciprocate the cutting blade in the radial direction of the roll at a position corresponding to a predetermined cutting portion on a surface of the roll; and a controller configured to move the cutting tool stage in the radial direction of the roll so that a cutting process of reciprocating the cutting blade in the radial direction of the roll while rotating the cutting blade, according to the control waveform, to cut the predetermined cutting portion once or multiple times with the reciprocating cutting blade at a predetermined cutting depth is performed multiple times.

A roll according to an embodiment is a cylindrical or columnar roll including a surface made of metal or an alloy, wherein a plurality of recesses is formed in an array on the surface of the roll, a wall surface of each of the recesses constitutes a part of a sphere, and $$d \geq 5 \ \mu m, \theta \geq 40°$$

wherein d represents a depth of each of the recesses, and θ represents an incident angle that is an inclination of the wall surface of each of the recesses, with respect to the surface of the roll, at an opening end of each of the recesses.

A transfer object according to an embodiment includes a transfer surface in which the surface shape of the roll described above is transferred onto a curable resin and cured.

Advantageous Effect

According to the disclosure, it is possible to form cutting holes by accurately cutting the same cutting portions on a roll multiple times, while preventing an increase in machining time, and to form cutting holes with larger incident angles.

BRIEF DESCRIPTION OF THE DRAWINGS

In the accompanying drawings:

FIG. 6 is a flowchart illustrating an example of operations of the roll manufacturing apparatus illustrated in FIG. 1;

DETAILED DESCRIPTION

Figure 1:
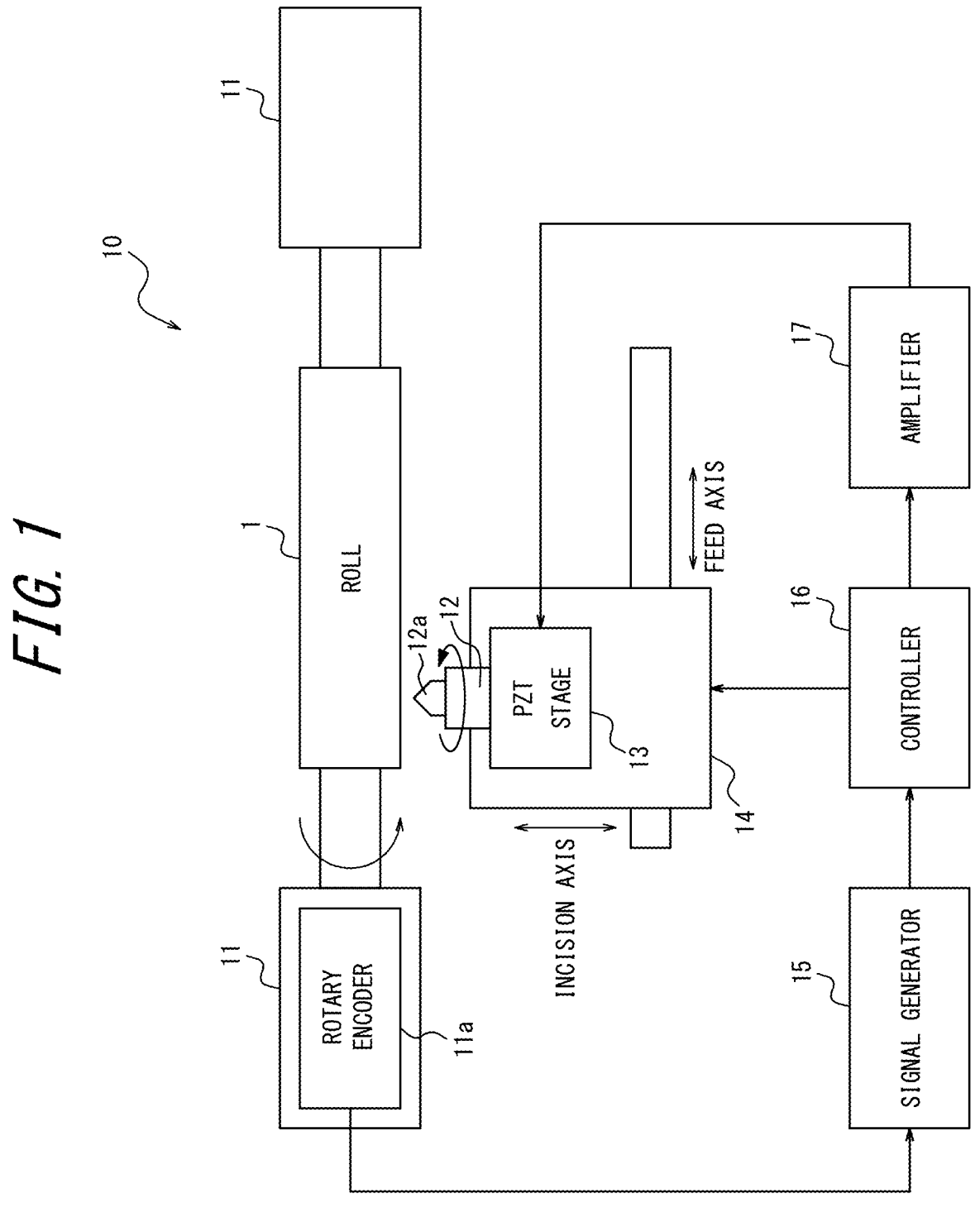
FIG. 1 is a diagram illustrating a configuration example of a roll manufacturing apparatus according to an embodiment of the disclosure.

Embodiments of the disclosure will be described below with reference to the drawings. In each figure, the same reference numerals indicate the same or equivalent components.

FIG. 1 illustrates a configuration example of a roll manufacturing apparatus 10 according to an embodiment of the disclosure. The roll manufacturing apparatus 10 according to the present embodiment is a manufacturing apparatus that cuts a cylindrical or columnar roll 1 to manufacture the roll 1 in which, for example, a pattern (transfer pattern) of an inverted shape of a standard pattern of microlens arrays is formed. The roll 1 in which the pattern is formed is used as, for example, a roll mold for manufacturing transfer objects such as microlens arrays.

The roll manufacturing apparatus 10 illustrated in FIG. 1 includes a rotary device 11, a spindle unit 12, a PZT stage 13, a cutting tool stage 14, a signal generator 15, a controller 16, and an amplifier 17.

The rotary device 11 supports the cylindrical or columnar roll 1 from an axial direction and rotates the roll 1 in a circumferential direction. The roll 1 is made of metal, such as Steel Use Stainless (SUS) as a base material. A surface of the roll 1 is plated with free-cutting plating such as Ni—P or Cu. In other words, the surface of the roll 1 is composed of metal or an alloy. The roll 1 is not limited to plating, but may also be made of a free-cutting material such as pure copper or aluminum. The rotary device 11 includes a rotary encoder 11a.

The rotary encoder 11a outputs signals corresponding to the rotational position of the roll 1 to the signal generator 15. The signals corresponding to the rotational position of the roll 1 include a trigger signal that is output every time the rotational position of the roll 1 reaches a predetermined reference position in one rotation, and a pulse signal that is output every time the roll 1 rotates by a predetermined amount.

The spindle unit 12 holds a cutting blade 12a that cuts the roll 1 in a rotatable manner. Specifically, the spindle unit 12 holds the cutting blade 12a so that the cutting blade 12a can rotate with a radial direction of the roll 1 as a rotation axis. The cutting blade 12a is composed of a hard material such as, for example, a ceramic chip, a diamond chip, or a carbide chip.

FIGS. 2A to 2E illustrate examples of the shape of the cutting blade 12a. In each of FIGS. 2A to 2E, a front view of a tip end of the cutting blade 12a (viewed along the rotation axis of the cutting blade 12a) and a side view of the cutting blade 12a (viewed from a side of the cutting blade 12a) are illustrated.

Figure 2A:
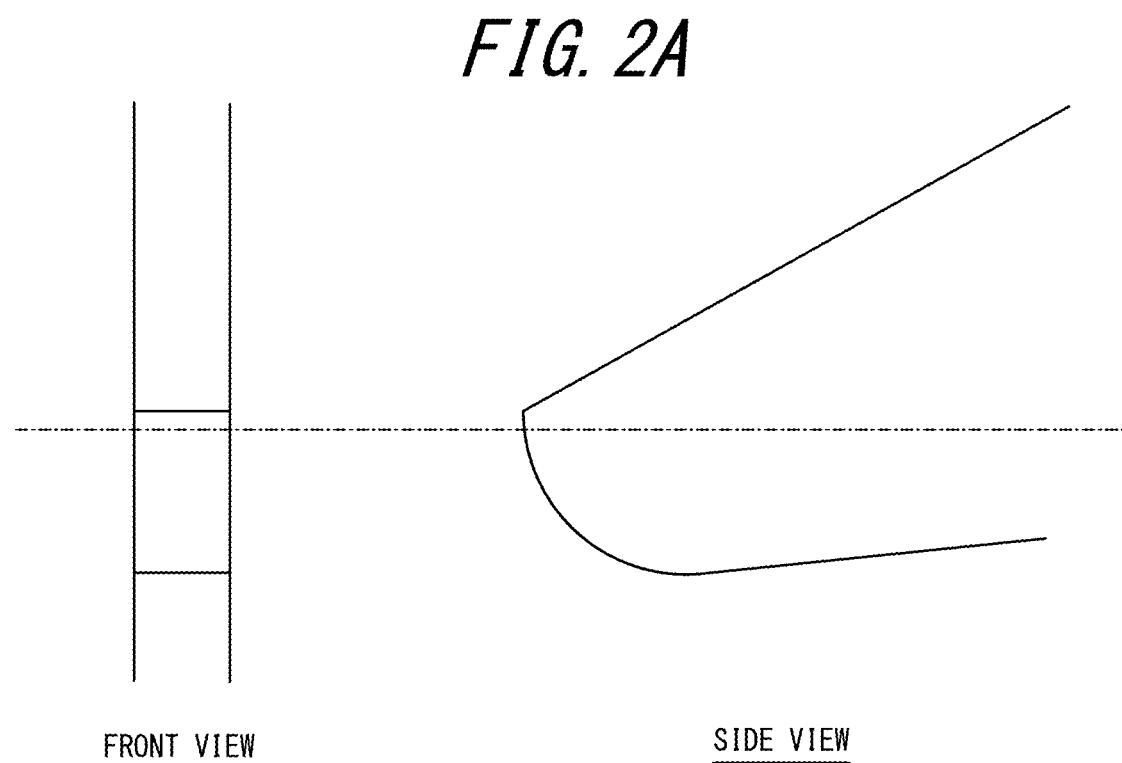
FIG. 2A is a diagram illustrating an example of a configuration of a cutting blade illustrated in FIG. 1.
Figure 3A:
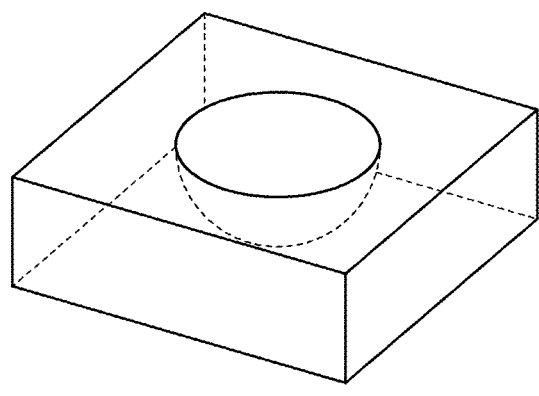
FIG. 3A is a diagram illustrating a cutting hole formed by the cutting blade illustrated in FIG. 2A.

The tip end of the cutting blade 12a is, for example, R-shaped (curved into an arc) in the side view, as illustrated in FIG. 2A. Cutting the roll 1 by rotating the cutting blade 12a with the R-shaped tip end can form a hemispherical cutting hole with an R-shaped bottom, as illustrated in FIG. 3A.

Figure 2B:
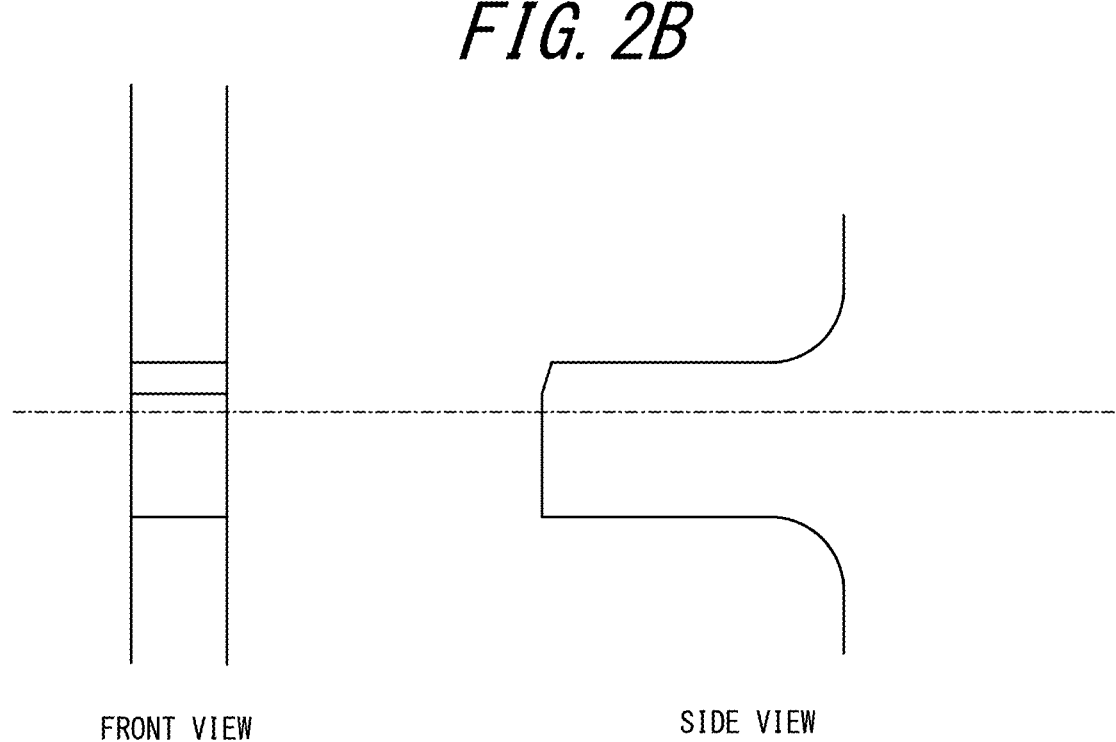
FIG. 2B is a diagram illustrating another example of the configuration of the cutting blade illustrated in FIG. 1.
Figure 3B:
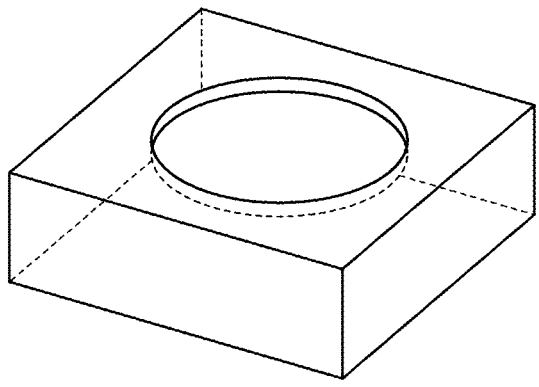
FIG. 3B is a diagram illustrating a cutting hole formed by the cutting blade illustrated in FIG. 2B.

The tip end of the cutting blade 12a is, for example, angular, as illustrated in FIG. 2B. Cutting the roll 1 by rotating the cutting blade 12a with the angular tip end can form a columnar cutting hole with a planar bottom, as illustrated in FIG. 3B.

Figure 2C:
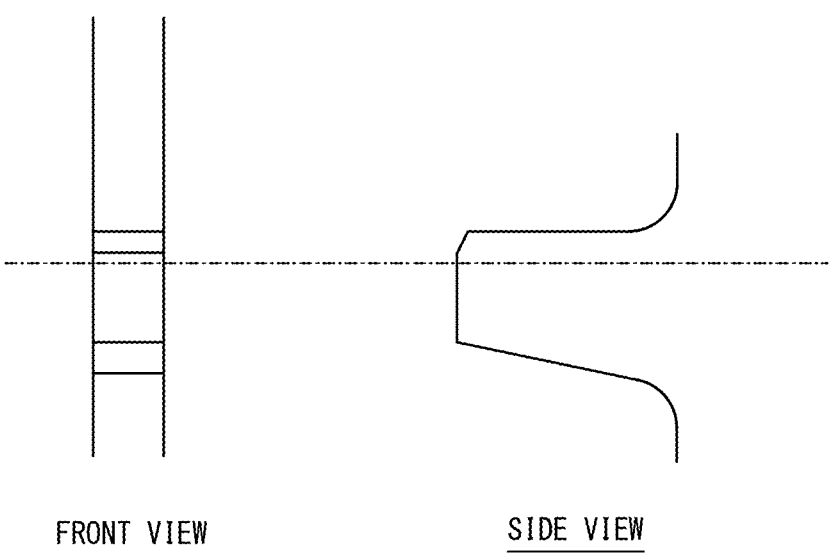
FIG. 2C is a diagram illustrating yet another example of the configuration of the cutting blade illustrated in FIG. 1.
Figure 3C:
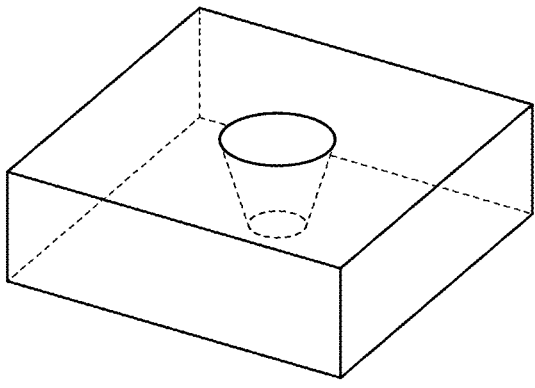
FIG. 3C is a diagram illustrating a cutting hole formed by the cutting blade illustrated in FIG. 2C.

The tip end of the cutting blade 12a is, for example, trapezoidal, as illustrated in FIG. 2C. Cutting the roll 1 by rotating the cutting blade 12a with the trapezoidal tip end can form a cutting hole in the shape of a frustum of a cone, as illustrated in FIG. 3C.

Figure 2D:
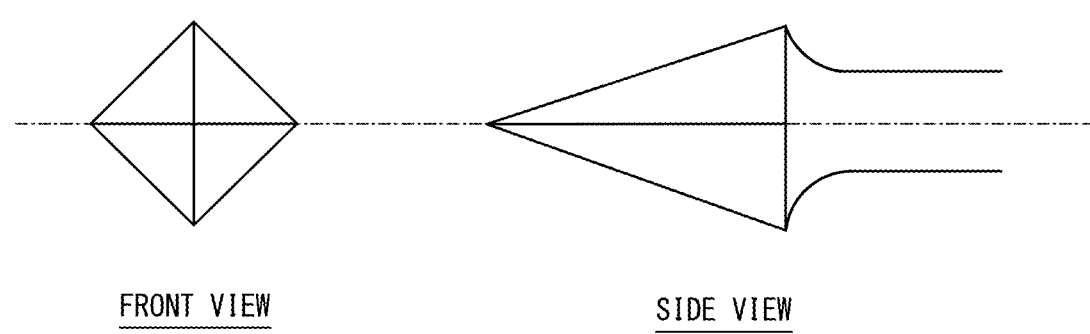
FIG. 2D is a diagram illustrating yet another example of the configuration of the cutting blade illustrated in FIG. 1.
Figure 3D:
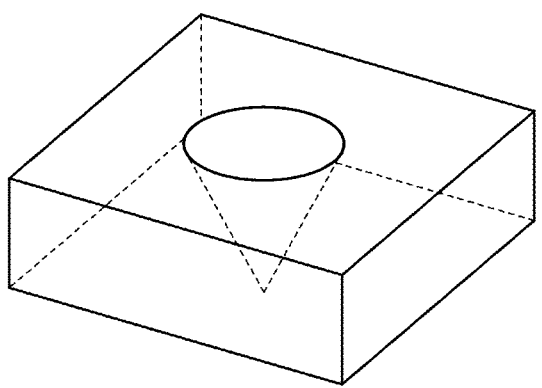
FIG. 3D is a diagram illustrating a cutting hole formed by the cutting blade illustrated in FIG. 2D.

The tip end of the cutting blade 12a is, for example, pyramidal, as illustrated in FIG. 2D. Cutting the roll 1 by rotating the cutting blade 12a with the pyramidal tip end can form a conical cutting hole, as illustrated in FIG. 3D.

Figure 2E:
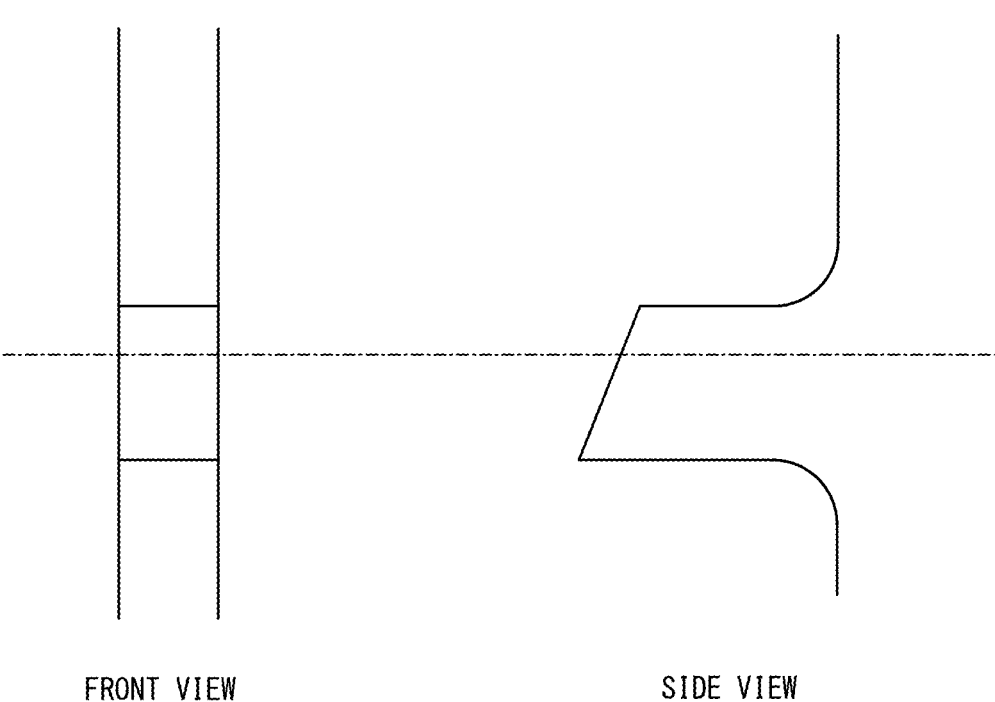
FIG. 2E is a diagram illustrating yet another example of the configuration of the cutting blade illustrated in FIG. 1.
Figure 3E:
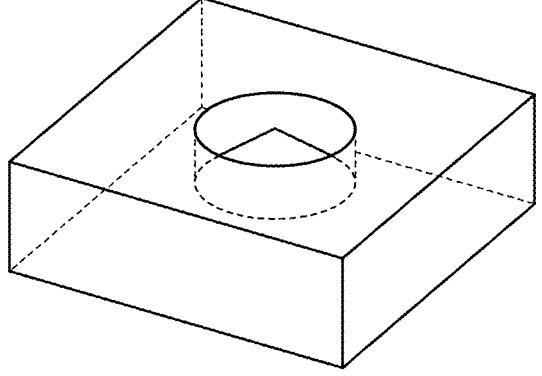
FIG. 3E is a diagram illustrating a cutting hole formed by the cutting blade illustrated in FIG. 2E.

The tip end of the cutting blade 12a has, for example, a shape with different heights on both sides, as illustrated in FIG. 2E. Cutting the roll 1 by rotating the cutting blade 12a whose tip end has the shape with different heights on both sides can form a cup-shaped cutting hole with a bottom protruding toward the surface of the roll 1, as illustrated in FIG. 3E.

Referring again to FIG. 1, the PZT stage 13 holds the spindle unit 12 including the cutting blade 12a. The PZT stage 13 includes a lead zirconate titanate (PZT) piezoelectric element, which expands and contracts in response to a voltage level of a drive signal to reciprocate the spindle unit 12 in the radial direction of the roll 1. Therefore, the spindle unit 12 and the cutting blade 12a held by the spindle unit 12 are reciprocatable in the radial direction of the roll 1 by the PZT stage 13. Note that, a drive means for driving the spindle unit 12 is not limited to the PZT piezoelectric element.

The cutting tool stage 14 holds the PZT stage 13 and moves in an incision axial direction (the radial direction of the roll 1) and a feed axial direction (the axial direction of the roll 1). As the cutting tool stage 14 moves, the PZT stage 13 and the spindle unit 12, which are held by the cutting tool stage 14, also move in the incision axial direction and the feed axial direction. While the roll 1 is rotated, the cutting blade 12a, which is rotated by the spindle unit 12, is reciprocated in the radial direction of the roll 1 by the PZT stage 13 to cut the roll 1, and the PZT stage 13 is moved in the axial direction of the roll 1, so cutting holes can be formed over the entire surface of the roll 1.

The signal generator 15 generates, based on the signals output from the rotary encoder 11a, a control waveform indicating a movement pattern of the cutting blade 12a to reciprocate the cutting blade 12a at positions corresponding to predetermined cutting portions on the surface of the roll 1. The generation of the control waveform by the signal generator 15 will be described with reference to FIG. 4.

Figure 4:
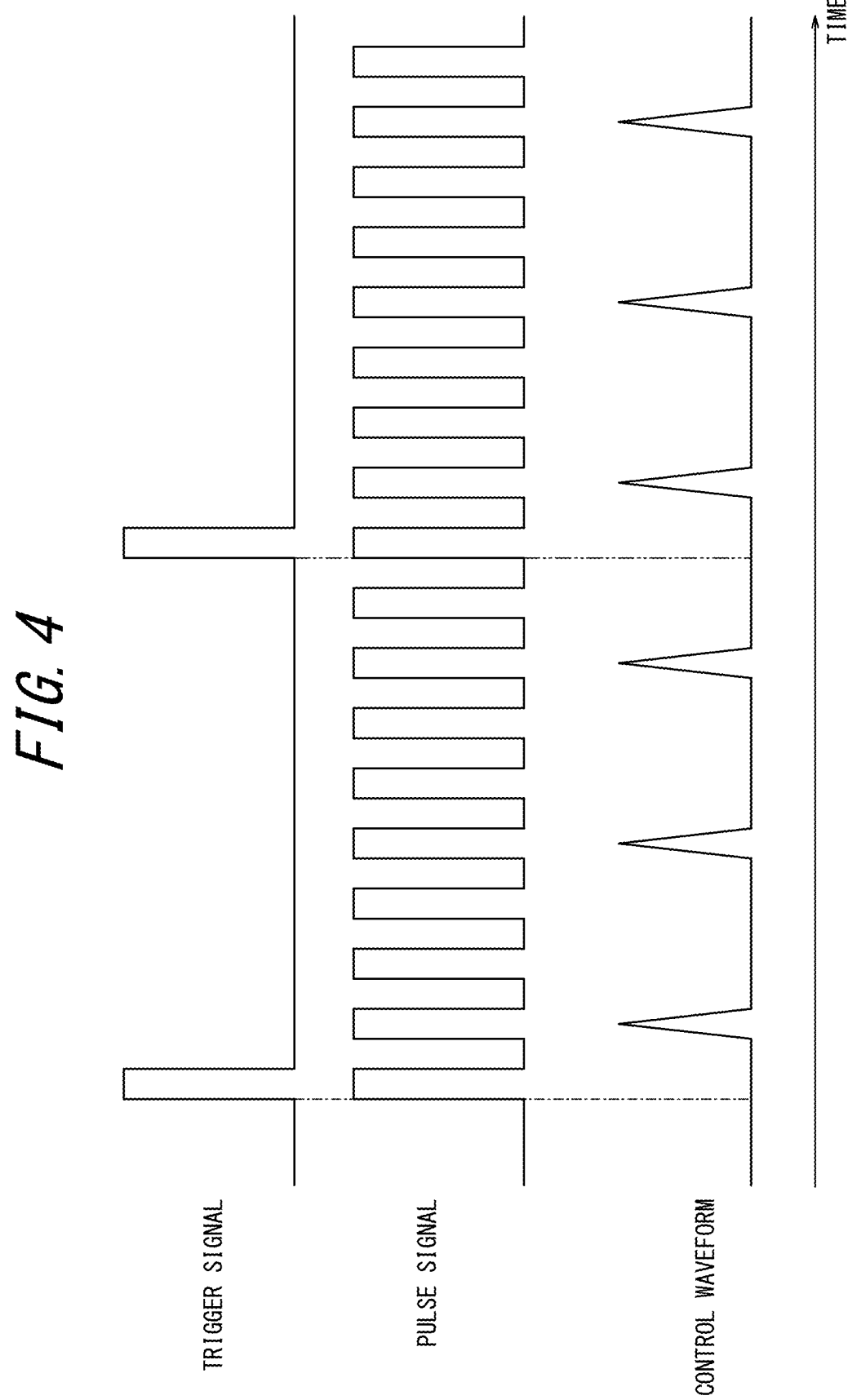
FIG. 4 is a diagram for explaining the generation of a control waveform by a signal generator illustrated in FIG. 1.

As described above, the rotary encoder 11a outputs the trigger signal every time the rotational position of the roll 1 reaches the predetermined reference position in one rotation. Specifically, as illustrated in FIG. 4, for example, the rotary encoder 11a outputs, as the trigger signal, a pulse-shaped signal that rises every time the rotational position of the roll 1 reaches the predetermined reference position in one rotation. Also, as illustrated in FIG. 4, the rotary encoder 11a outputs, as the pulse signal, a pulse-shaped signal that rises every time the roll 1 rotates by the predetermined amount. For example, the rotary encoder 11a outputs, as the pulse signal, a pulse-shaped signal that rises every 1,440,000 divisions of one rotation of the roll 1.

The signal generator 15 counts the pulse signal with respect to the output timing of the trigger signal (the timing when the trigger signal rises). The signal generator 15 then generates, as illustrated in FIG. 4, the control waveform according to the number of counts of the pulse signal. By counting the pulse signal with respect to the output timing of the trigger signal, the rotational position of the roll 1 from the predetermined reference position can be identified. Therefore, by generating the control waveform according to the number of counts of the pulse signal with respect to the output timing of the trigger signal, the predetermined cutting portions of the roll 1 can be cut accurately and repeatedly.

Figure 5:
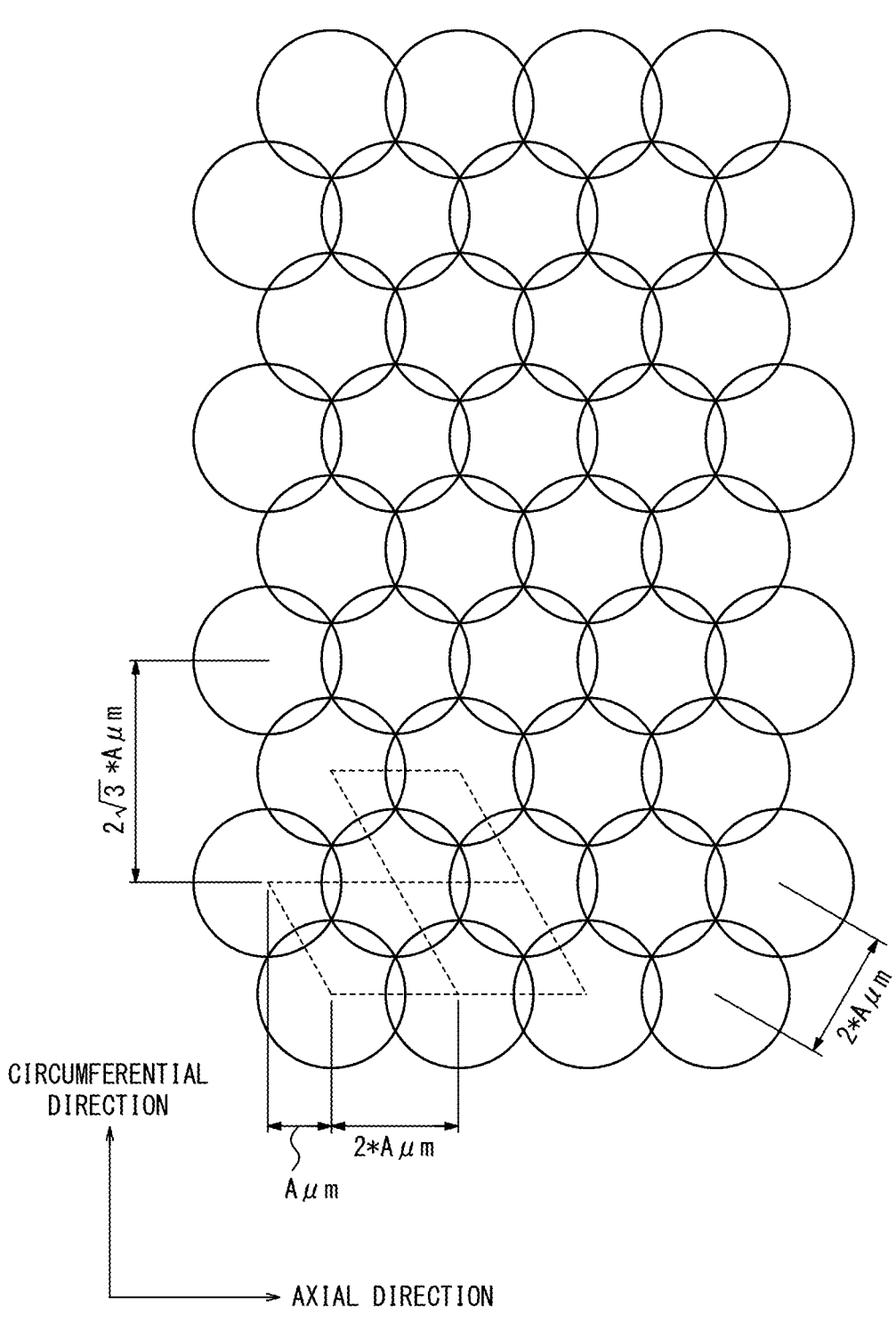
FIG. 5 is a diagram illustrating an example of an arrangement pattern of cutting holes formed in a roll.

FIG. 5 illustrates an example of an arrangement pattern of the cutting holes cut in the roll 1.

As illustrated in FIG. 5, a pattern in which rhombuses with one side and another opposite side parallel to the axial direction and the other two sides inclined on the order of 30 degrees in the circumferential direction are arranged successively in the axial direction and the circumferential direction will be considered. The cutting holes are arranged centering at four vertices of each rhombus. Two cutting holes centered at both ends of a side parallel to the axial direction partially overlap. Two cutting holes centered at both ends of a side inclined in the circumferential direction partially overlap. When the distance in the axial direction between the centers of the two cutting holes centered at both the ends of the side inclined in the circumferential direction is A μm, the distance between the centers of two cutting holes adjacent in the circumferential direction is, for example, $2\sqrt{3}*A$ μm. The distance between the centers of the two cutting holes adjacent in the axial direction is, for example, $2*A$ μm. The distance between the centers of the two cutting holes centered at both the ends of the side inclined in the circumferential direction is, for example, $2*A$ μm.

The signal generator 15 generates the control waveform so that the cutting holes are formed in the roll 1 according to the arrangement pattern of the cutting holes described with reference to FIG. 5. In other words, the signal generator 15 generates the control waveform so that the cutting blade 12a cuts the roll 1 at the rotational position of the roll 1 corresponding to the position of each cutting hole.

Referring again to FIG. 1, the controller 16 reciprocates the cutting blade 12a in the radial direction of the roll 1, according to the control waveform generated by the signal generator 15, to cut the roll 1. Specifically, the controller 16 reciprocates the spindle unit 12 (cutting blade 12a) in the radial direction of the roll 1 based on the control waveform. Furthermore, the controller 16 moves the cutting tool stage 14 in the radial direction of the roll 1 so that a cutting process of cutting the predetermined cutting portions of the roll 1 once or multiple times with the reciprocating spindle unit 12 (cutting blade 12a) at a predetermined cutting depth is performed multiple times. The roll 1 is thereby cut at the predetermined depth with the reciprocating cutting blade 12a. The cutting depth and the number of times of cutting in each cutting process are, for example, input to the controller 16 in advance. The controller 16 generates a drive signal to drive the PZT stage 13 and outputs the drive signal to the amplifier 17.

A case in which cutting holes are formed in a cutting process that cuts x times at a cutting depth d1 and a cutting process that cuts y times at a cutting depth d2 will be exemplarily described. In this case, the controller 16 drives the PZT stage 13, according to the control waveform, to reciprocate the cutting blade 12a in the radial direction of the roll 1. Then, the controller 16 sequentially moves the cutting tool stage 14 so that the reciprocating cutting blade 12a cuts the roll 1 x times at the cutting depth d1. Next, the controller 16 sequentially moves the cutting tool stage 14 so that the reciprocating cutting blade 12a cuts the roll 1 y times at the cutting depth d2.

The amplifier 17 amplifies the drive signal output from the controller 16 and outputs the amplified drive signal to the PZT stage 13. The PZT stage 13 is driven by the amplified drive signal so that the spindle unit 12 (cutting blade 12a) reciprocates in the radial direction of the roll 1 to cut the roll 1.

Thus, in the present embodiment, the control waveform is generated based on the signal output from the rotary encoder 11a, and the spindle unit 12 (the cutting blade 12a rotated by the spindle unit 12) is controlled, based on the control waveform, to reciprocate to cut the roll 1, thereby allowing accurate cutting of the predetermined cutting portions. Therefore, even when the cutting process of cutting once or multiple times at the predetermined cutting depth is repeated multiple times, the same cutting portions can be cut accurately. As a result, the occurrence of burrs can be prevented.

Figure 11:
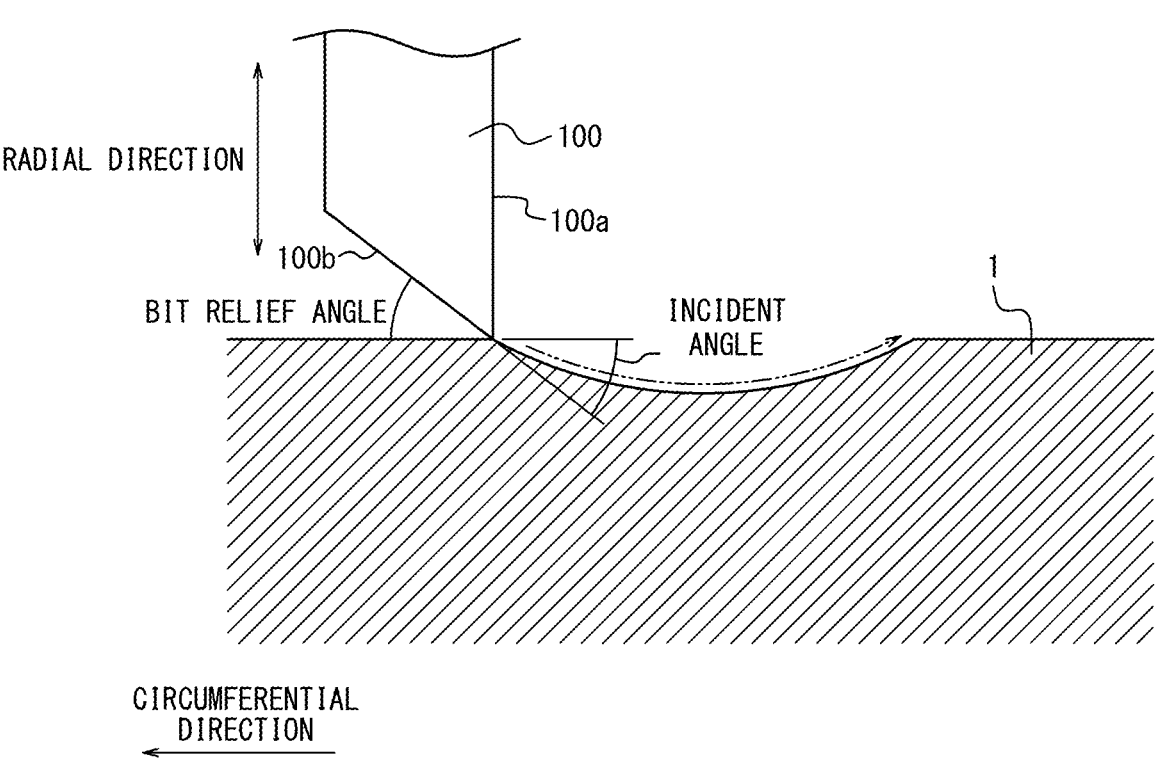
FIG. 11 is a diagram for explaining the conventional formation of a cutting hole in a roll.

As described with reference to FIG. 11, when the roll 1 is cut as if a cutting blade 100 slides on the surface of the roll 1, there is a limitation that an incident angle θ, which is an inclination of a wall surface of a cutting hole (recess), with respect to the surface of the roll 1, at an opening end of the cutting hole cannot be greater than or equal to a bit relief angle of the cutting blade 100. In the present embodiment, the roll 1 is cut by the cutting blade 12a that rotates with the radial direction of the roll 1 as a rotation axis, so there is no such limitation. Therefore, cutting holes (recesses) with larger incident angles θ can be formed.

In the present embodiment, the cutting portions are determined according to the number of counts of the pulse signal with respect to the output timing of the trigger signal, and cutting is performed sequentially, so an increase in machining time can be prevented.

Therefore, according to the roll manufacturing apparatus 10 of the present embodiment, it is possible to form the cutting holes by accurately cutting the same cutting portions on the roll 1 multiple times, while preventing an increase in machining time, and to form the cutting holes with the larger incident angles.

The roll 1 manufactured by the roll manufacturing apparatus 10 can be used as a mold (roll mold) to manufacture transfer objects, such as microlens arrays, that have transfer surfaces in which the surface shape of the roll 1 is transferred onto a curable resin and cured. The transfer objects can be manufactured, for example, as follows.

An (uncured) curable resin layer is formed by dropping an uncured curable resin (e.g., acrylic UV curable resin) onto a base material made of polyethyleneterephthalate (PET). Next, the manufactured roll mold is pressed against the formed curable resin layer, and UV light is applied to the curable resin layer in this state to cure the curable resin layer. After curing the curable resin layer, the cured curable resin layer is peeled off from the roll mold to manufacture the transfer objects with the transfer surfaces in which the surface shape of the roll 1 is transferred onto the curable resin.

FIG. 6 is a flowchart illustrating an example of operations of the roll manufacturing apparatus 10 according to the present embodiment.

The roll 1 is placed on the rotary device 11 (step S101).

Next, a flattening process to flatten a plating layer on the surface of the roll 1 is performed on the roll 1 (step S102).

Next, the PZT stage 13 is set on the cutting tool stage 14, and the spindle unit 12 is set on the PZT stage 13 (step S103).

Next, the cutting blade 12a is set on the spindle unit 12 (step S104).

Next, the rotation speed of the spindle unit 12 is set (step 105).

Next, the spindle unit 12 starts to rotate (step S106). Thereby, the cutting blade 12a held by the spindle unit 12 also rotates.

Next, the rotation speed (roll rotation speed) of the roll 1 by the rotary device 11 is set (step S107), and the rotary device 11 starts to rotate the roll 1 at the set roll rotation speed (step S108).

Next, the position of the cutting tool stage 14 is set to a start position in the feed axial direction and a start position in the incision axial direction (steps S109 and S110), and the cutting tool stage 14 starts to drive (step S111).

The roll 1 is cut with the rotating cutting blade 12a reciprocating in the radial direction of the roll 1 according to the control waveform generated by the signal generator 15 (step S112).

The cutting tool stage 14 moves to an end position in the feed axial direction, and the cutting process of cutting the predetermined cutting portions at the predetermined cutting depth is repeated multiple times to complete the cutting of cutting holes (step S113).

When the cutting blade 12a is worn and needs to be replaced, the cutting blade 12a is replaced (step S114) and the cutting blade 12a is positioned (step S115). Then, the processes from step S109 to step S115 are repeated.

Figure 7:
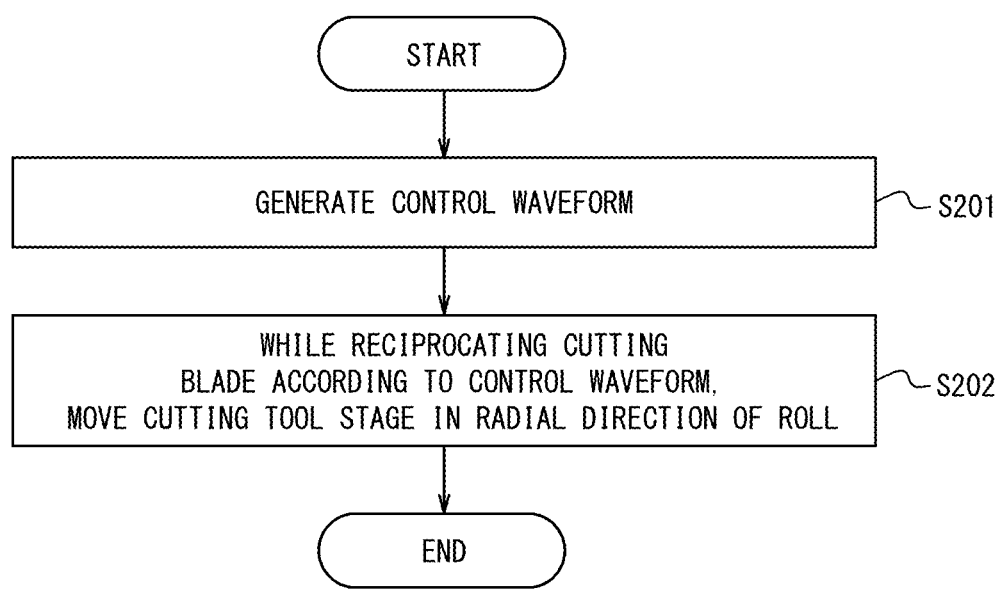
FIG. 7 is a flowchart for explaining a roll manufacturing method by the roll manufacturing apparatus illustrated in FIG. 1.

Next, a roll manufacturing method using the roll manufacturing apparatus 10 according to the present embodiment will be described with reference to a flowchart illustrated in FIG. 7. In FIG. 7, the generation of the control waveform indicating the movement pattern of the cutting blade 12a and the cutting by the cutting blade 12a according to the control waveform will be described in particular.

The signal generator 15 generates the control waveform to reciprocate the cutting blade 12a in the radial direction of the roll 1 at the positions corresponding to the predetermined cutting portions on the surface of the roll 1 based on the signals that are output from the rotary encoder 11a and that are according to the rotational position of the roll 1 (step S201).

The controller 16 reciprocates, according to the control waveform generated by the signal generator 15, the cutting blade 12a, which rotates with the radial direction of the roll 1 as the rotation axis, in the radial direction of the roll 1. Further, the controller 16 moves the cutting tool stage 14 in the radial direction of the roll 1 so that the cutting process of cutting the predetermined cutting portions of the roll 1 once or multiple times with the reciprocating cutting blade 12a at the predetermined cutting depth is performed multiple times (step S202). Specifically, the controller 16 generates the drive signal for the PZT stage 13 so that the spindle unit 12 (the cutting blade 12a) moves in the radial direction of the roll 1 according to the control waveform, and outputs the signal to the amplifier 17. The controller 16 also moves the cutting tool stage 14 in the radial direction of the roll 1 so that the roll 1 is cut at the cutting depth and by the number of times predetermined in the cutting process.

As described above, the roll manufacturing method according to the present embodiment includes a generation step of generating, based on the signals output from the rotary encoder 11a, the control waveform indicating the movement pattern of the cutting blade 12a to reciprocate the cutting blade 12a in the radial direction of the roll 1 at the positions corresponding to the predetermined cutting portions on the surface of the roll 1, and a cutting step of moving the cutting tool stage 14 in the radial direction of the roll 1 so that the cutting process of reciprocating the cutting blade 12a in the radial direction of the roll 1 while rotating the cutting blade 12a, according to the control waveform, to cut the predetermined cutting portions once or multiple times with the reciprocating cutting blade 12a at the predetermined cutting depth is performed multiple times.

By generating the control waveform based on the signals output from the rotary encoder 11a and cutting the roll 1 by reciprocating the rotating cutting blade 12a based on the control waveform, the predetermined cutting portions can be cut accurately. Therefore, the same cutting portions can be cut accurately even when the cutting process of cutting once or multiple times at the predetermined cutting depth is repeated multiple times.

Since the cutting blade 12a, which rotates with the radial direction of the roll 1 as the rotation axis, cuts the roll 1, the cutting holes (recesses) with the larger incident angles θ can be formed because there is no limitation by the bit relief angle of the cutting blade 100, as described with reference to FIG. 11.

In addition, in the present embodiment, the cutting portions are determined according to the number of counts of the pulse signal based on the output timing of the trigger signal, and cutting is performed sequentially, so an increase in machining time can be prevented.

Therefore, according to the roll manufacturing method of the present embodiment, it is possible to form the cutting holes by accurately cutting the same cutting portions on the roll multiple times, while preventing an increase in machining time, and to form the cutting holes with the larger incident angles.

EXAMPLES

Next, the disclosure will be described more concretely with reference to the following examples and comparative examples, but the disclosure is not limited to the following examples.

Example 1

A roll with Ni—P plating on a surface of SUS304 was prepared. The diameter of the roll was 130 mm, and the length of the roll was 250 mm.

Next, the prepared roll was placed on the roll manufacturing apparatus according to the present embodiment, and a Ni—P plating layer on the surface of the roll was subjected to a flattening process. The roll after the flattening process was cut to form cutting holes. As the cutting blade, a cutting blade made of a diamond bit with an R-shaped (R=0.05 m) tip end was used, as illustrated in FIG. 2A. The rotation speed of the roll was set to 0.1 min−1 and the cutting depth of the roll was 13.0 μm. The curvature of the cutting holes was 50 μm. The number of revolutions of a spindle was set to 160000 min−1. The arrangement of the cutting holes was made according to the arrangement pattern illustrated in FIG. 5. Thereby, the multiple cutting holes (recesses) were formed in an array, and a roll in which a wall surface of each cutting hole constituted part (hemisphere) of a sphere, as illustrated in FIG. 3A, was manufactured.

Example 2

In this example, the cutting depth was set to 20 μm. The other conditions were the same as in Example 1.

Example 3

In this example, the cutting depth was set to 27.5 μm and the curvature of the cutting holes was set to 100 μm. The other conditions were the same as in Example 1.

Comparative Example 1

In this comparison example, the same processing as in Example 1 was performed using an ordinary processing machine that cuts the roll one portion at a time using NC control with a rotating cutting blade.

Comparative Example 2

In this comparison example, the same processing as in Example 1 was performed using the ordinary processing machine described above.

Comparative Example 3

In this comparison example, the same processing as in Example 3 was performed using the ordinary processing machine described above.

In Examples 1 to 3 and Comparative Examples 1 to 3, machining time required to form the cutting holes of one round on the roll was measured. In each of Examples 1 to 3 and Comparative Examples 1 to 3, the incident angle of the cutting holes formed on the roll was also measured. In all of Examples 1 to 3 and Comparative Examples 1 to 3, the cutting holes were formed with the set cutting depth and curvature.

Table 1 indicates the machining time and the incident angle of the cutting holes in Examples 1 to 3 and Comparative Examples 1 to 3.

TABLE 1

| | Example 1 | Example 2 | Example 3 | Comparative Example 1 | Comparative Example 2 | Comparative Example 3 |
|---|---|---|---|---|---|---|
| Incident angle (°) | 42 | 52 | 43 | 42 | 52 | 43 |
| Machining time (min) | 10 | 10 | 10 | 160 | 160 | 112 |

As in Table 1, the cutting holes with incident angles of 40° or more were formed in all of Examples 1 to 3. Thus, according to the present embodiment, it was possible to manufacture the rolls with the depth d of the cutting holes (recesses)≥5 μm and an incident angle θ≥40°, which was an inclination of the wall surface of each cutting hole, with respect to the surface of the roll, at an opening end of each cutting hole (recess).

As in Table 1, in Examples 1 to 3, the machining time was reduced on the order of 1/10 to 1/16, as compared to Comparative Examples 1 to 3. Therefore, according to the present embodiment, it was verified that an increase in the machining time can be prevented.

Figure 8A:
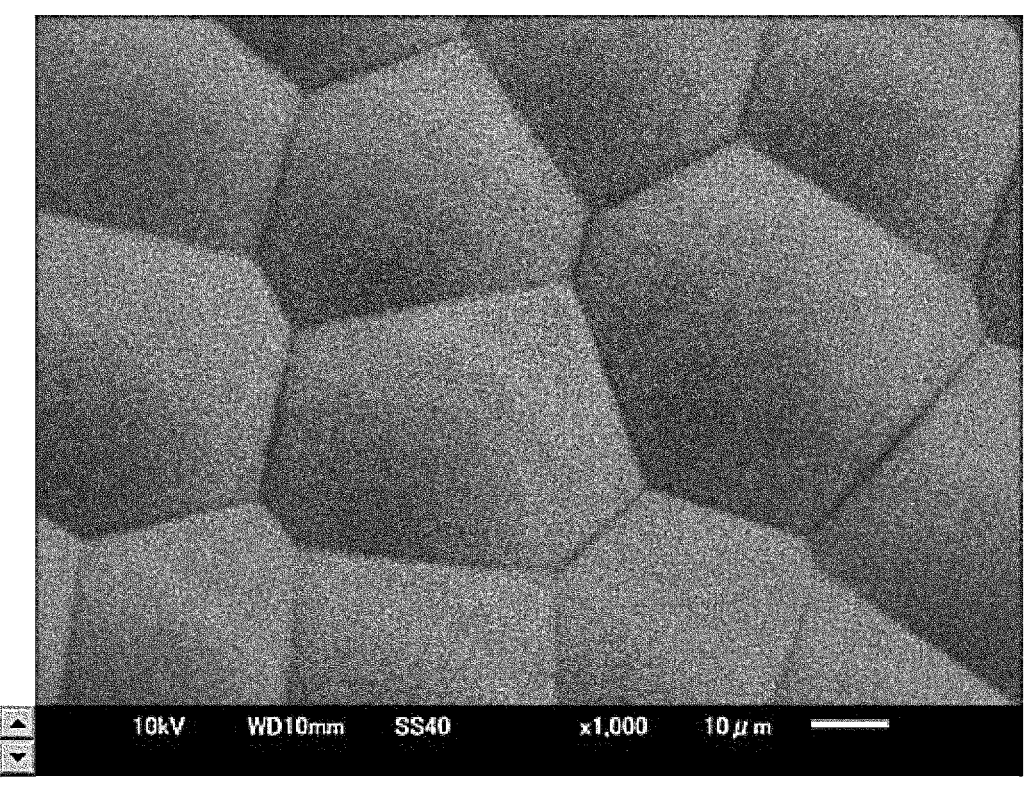
FIG. 8A is a photographed image of a surface of a transfer object onto which a surface pattern of a roll in which cutting holes are formed by a machining method using no cutting blade is transferred.
Figure 8B:
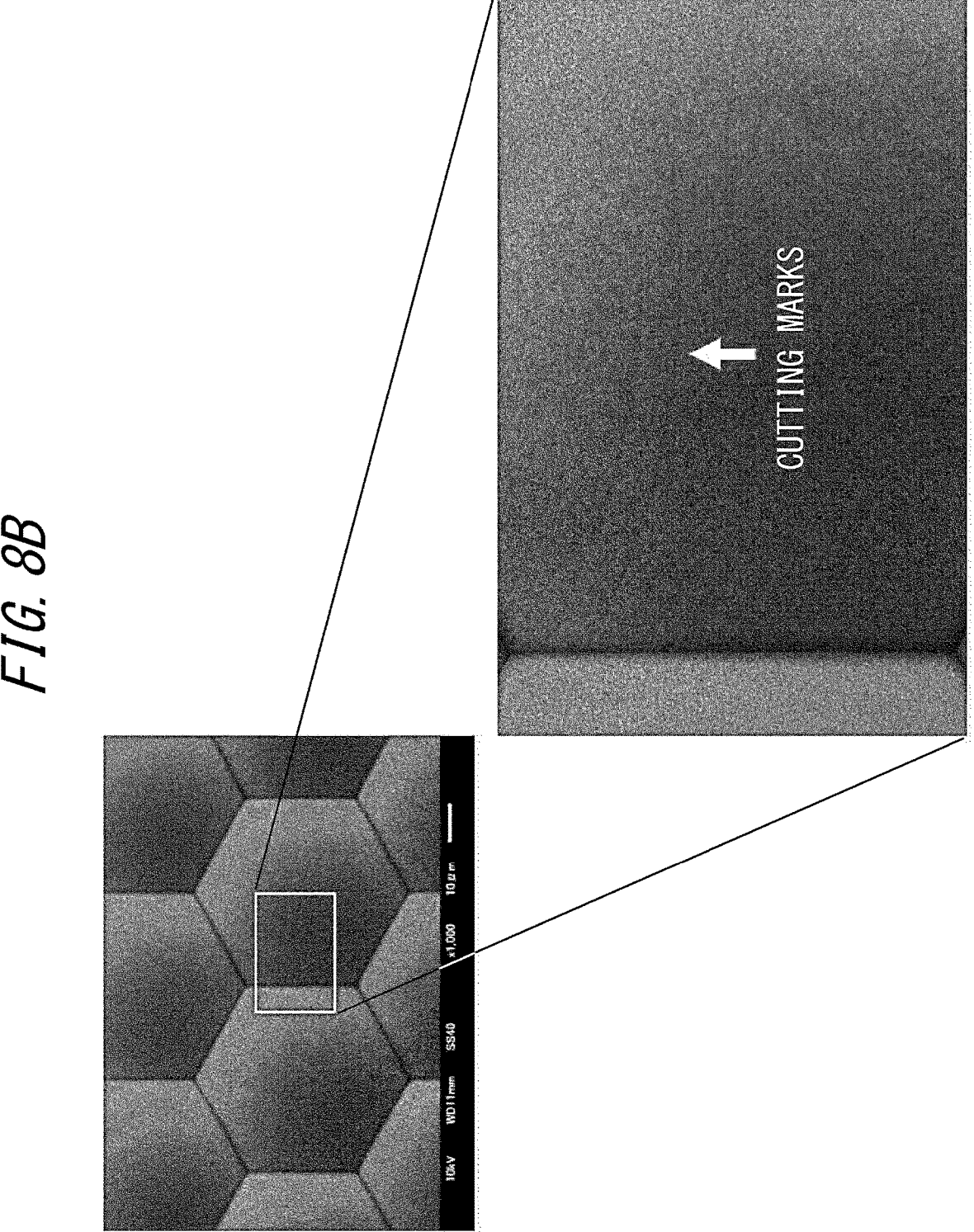
FIG. 8B is a photographed image of a surface of a transfer object onto which a surface pattern of a roll in which cutting holes are formed with a rotating cutting blade is transferred.

When holes are formed in rolls by processing methods that do not use any cutting blades, such as lithography, no cutting marks are left. On the other hand, cutting with a cutting blade may leave cutting marks on the surface of the roll 1. FIG. 8A is an image of a surface of a transfer object onto which a surface pattern of a roll 1 with holes formed without using cutting with a cutting blade is transferred, and FIG. 8B is an image of a surface of a transfer object onto which a surface pattern of a roll 1 with cutting holes formed with a rotating cutting blade as in the present embodiment is transferred, photographed by a Scanning Electron Microscope (SEM).

As in FIG. 8A, when cutting with a cutting blade was not performed, no cutting marks were observed on the surface of the roll 1 and on the transfer object onto which the surface pattern of the roll 1 was transferred. On the other hand, as in FIG. 8B, when the roll 1 was cut with the rotating cutting blade, cutting marks were observed along the direction of rotation of the cutting blade. Such cutting marks are acceptable to the extent of causing no degradation in the optical properties of microlens arrays manufactured using the roll 1, for example.

The above embodiment describes an example in which the cutting holes are formed by cutting with the cutting blade 12*a*, but the disclosure is not limited to this. For example, cutting grooves extending in predetermined directions can be formed.

Figure 9A:
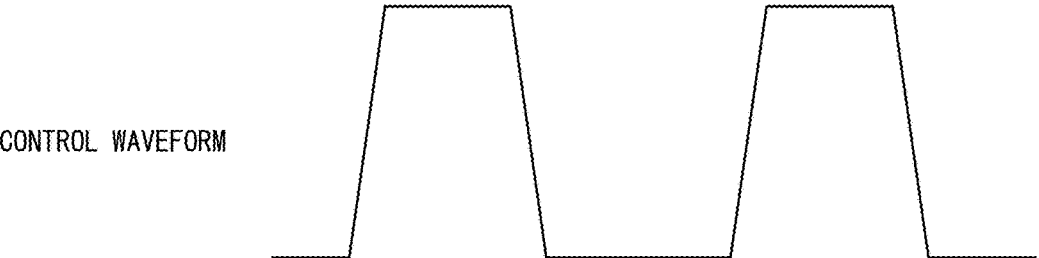
FIG. 9A is a diagram illustrating an example of the control waveform.
Figure 9B:
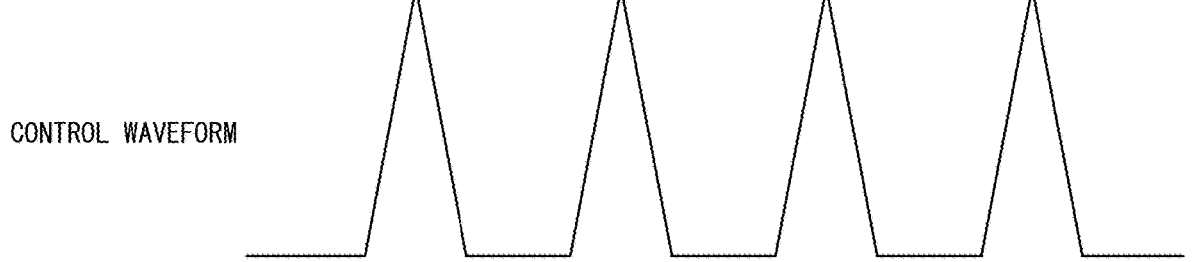
FIG. 9B is a diagram illustrating another example of the control waveform.

When forming the cutting grooves, for example, a trapezoidal control waveform illustrated in FIG. 9A or a triangular control waveform illustrated in FIG. 9B can be used to form, on the surface of the roll 1, the cutting grooves that extend in the circumferential direction of the roll 1.

Figure 10:
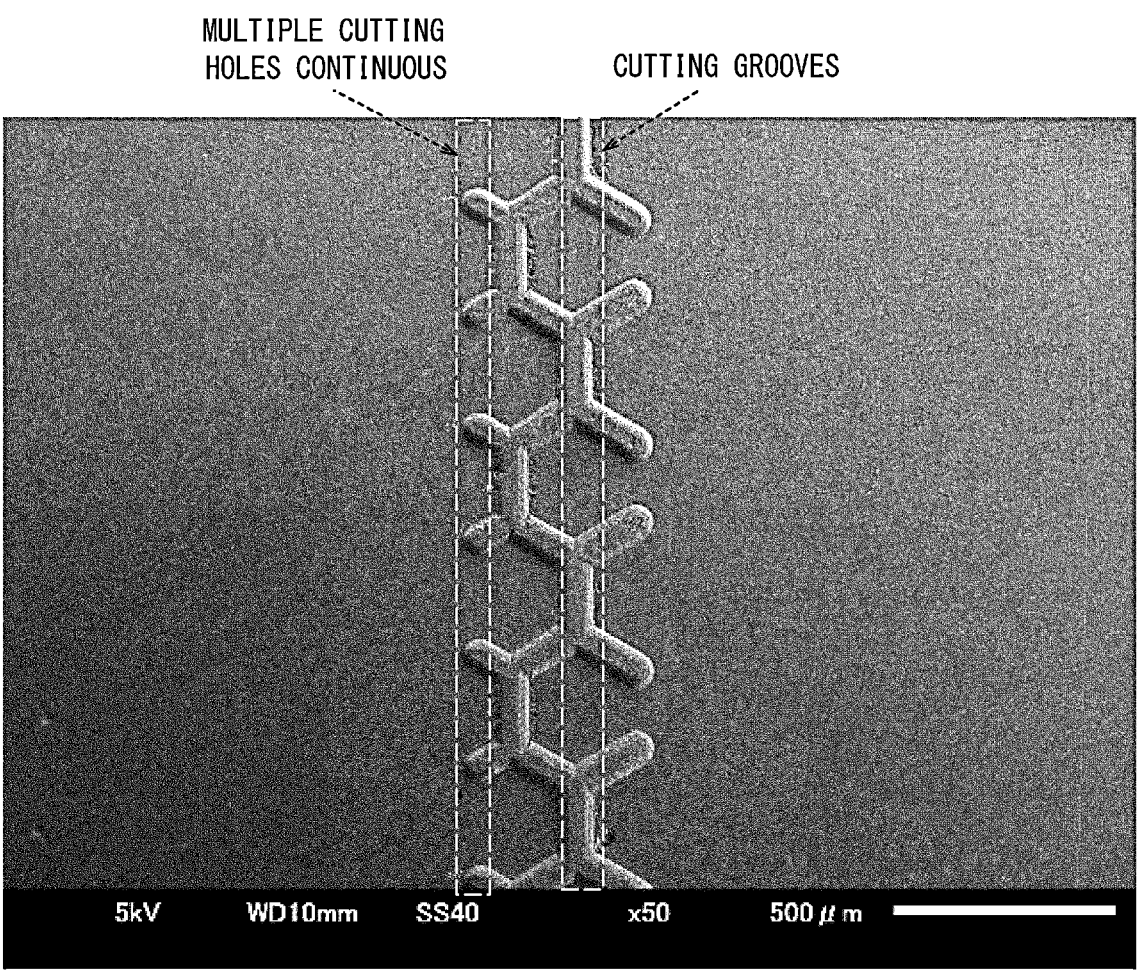
FIG. 10 is a photographed image of a surface of a transfer object that is manufactured using a roll in which cutting grooves are formed.

FIG. 10 is an image of a surface of a transfer object onto which a surface pattern of a roll 1 with cutting grooves is transferred, photographed by the SEM. In FIG. 10, the trapezoidal control waveform illustrated in FIG. 9A and the triangular control waveform illustrated in FIG. 9B are combined. When the control waveform illustrated in FIG. 9A was used, cutting grooves extending in the circumferential direction of the roll could be formed, as illustrated in FIG. 10, and when the control waveform illustrated in FIG. 9B was used, multiple cutting holes that were continuous in an oblique direction with respect to the circumferential direction of the roll 1 could be formed.

The signal generator 15 and the controller 16 are configured, for example, by a computer equipped with a memory and a processor. When the signal generator 15 and the controller 16 are configured by a computer, the signal generator 15 and the controller 16 are realized by a processor reading and executing a program for the present embodiments stored in a memory.

The program describing processing details to realize each function of the signal generator 15 and the controller 16 may be recorded on a computer-readable recording medium. With the use of such a recording medium, the program can be installed on a computer. Here, the recording medium on which the program is recorded may be a non-transitory recording medium. The non-transitory recording medium is not particularly limited, but may be, for example, a recording medium such as a CD-ROM or DVD-ROM.

The disclosure is not limited to the configurations specified in the above-described embodiments, and various variations are possible within the scope of not departing from the gist of the disclosure described in the claims. For example, functions included in each component can be rearranged so as not to be logically inconsistent, and multiple components can be combined into one or divided.

REFERENCE SIGNS LIST

10 roll manufacturing apparatus
11 rotary device
11*a* rotary encoder
12 spindle unit
12*a* cutting blade
13 PZT stage
14 cutting tool stage
15 signal generator
16 controller
17 amplifier

The invention claimed is:

1. A roll manufacturing method by a roll manufacturing apparatus comprising a rotary device and a cutting tool stage, the rotary device configured to rotate a cylindrical or columnar roll in a circumferential direction and including a rotary encoder that output a signal corresponding to a rotational position of the roll, the cutting tool stage being movable in a radial direction of the roll, the cutting tool stage being configured to hold a spindle unit reciprocatable in the radial direction of the roll, the spindle unit including a cutting blade rotatable with the radial direction of the roll as a rotation axis, the roll manufacturing method comprising:

generating, based on the signal output from the rotary encoder, a control waveform indicating a movement pattern of the cutting blade to reciprocate the cutting blade in the radial direction of the roll at a position corresponding to a predetermined cutting portion on a surface of the roll; and moving the cutting tool stage in the radial direction of the roll so that a cutting process of reciprocating the cutting blade in the radial direction of the roll while rotating the cutting blade, according to the control waveform, to cut the predetermined cutting portion once or multiple times with the reciprocating cutting blade at a predetermined cutting depth is performed multiple times.

2. The roll manufacturing method according to claim 1, wherein a tip end of the cutting blade is R-shaped, columnar, conical, or frustum-shaped.

3. A roll manufacturing apparatus comprising:

a rotary device configured to rotate a cylindrical or columnar roll in a circumferential direction and including a rotary encoder that output a signal corresponding to a rotational position of the roll;

a cutting tool stage movable in a radial direction of the roll, the cutting tool stage being configured to hold a spindle unit reciprocatably in the radial direction of the roll, the spindle unit including a cutting blade rotatable with the radial direction of the roll as a rotation axis;

a signal generator configured to generate, based on the signal output from the rotary encoder, a control waveform indicating a movement pattern of the cutting blade to reciprocate the cutting blade in the radial direction of the roll at a position corresponding to a predetermined cutting portion on a surface of the roll; and a controller configured to move the cutting tool stage in the radial direction of the roll so that a cutting process of reciprocating the cutting blade in the radial direction of the roll while rotating the cutting blade, according to the control waveform, to cut the predetermined cutting portion once or multiple times with the reciprocating cutting blade at a predetermined cutting depth is performed multiple times.

4. A cylindrical or columnar roll comprising a surface made of metal or an alloy, wherein a plurality of recesses is formed in an array on the surface of the roll, a wall surface of each of the recesses constitutes a part of a sphere, and $$d \geq 5 \ \mu m, \theta \geq 40°$$

wherein d represents a depth of each of the recesses, and θ represents an incident angle that is an inclination of the wall surface of each of the recesses, with respect to the surface of the roll, at an opening end of each of the recesses.

5. The roll according to claim 4, wherein a bottom of each of the recesses is R-shaped, conical, inverted conical, or planar.

6. A transfer object comprising a transfer surface in which a surface shape of the roll according to claim 4 is transferred onto a curable resin and cured.

\* \* \* \* \*